(12) United States Patent
Meng

(10) Patent No.: US 11,643,101 B2
(45) Date of Patent: May 9, 2023

(54) SYSTEMS AND METHODS FOR PREVENTING OPERATION OF A VEHICLE DURING MALFUNCTION OF A LIGHTING ELEMENT

(71) Applicant: TOYOTA MOTOR ENGINEERING & MANUFACTURING NORTH AMERICA, INC., Plano, TX (US)

(72) Inventor: Ming Michael Meng, Novi, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 207 days.

(21) Appl. No.: 17/164,566

(22) Filed: Feb. 1, 2021

(65) Prior Publication Data
US 2022/0185307 A1    Jun. 16, 2022

Related U.S. Application Data

(60) Provisional application No. 63/124,358, filed on Dec. 11, 2020.

(51) Int. Cl.
*B60W 50/12* (2012.01)
*B60W 50/10* (2012.01)

(52) U.S. Cl.
CPC .......... *B60W 50/12* (2013.01); *B60W 50/10* (2013.01); *B60W 2420/52* (2013.01)

(58) Field of Classification Search
None
See application file for complete search history.

(56) References Cited

U.S. PATENT DOCUMENTS

| | | | |
|---|---|---|---|
| 3,992,695 | A | 11/1976 | Mogi |
| 9,434,308 | B2 | 9/2016 | Bean |
| 10,155,477 | B1 | 12/2018 | Mclean et al. |
| 10,399,481 | B2 | 9/2019 | Mochizuki et al. |
| 2006/0214508 | A1 | 9/2006 | Binder |

(Continued)

FOREIGN PATENT DOCUMENTS

| | | | | |
|---|---|---|---|---|
| EP | 2008903 A1 | * | 12/2008 | ........ B60W 50/0205 |
| EP | 3138731 A1 | | 3/2017 | |

(Continued)

OTHER PUBLICATIONS

Espacenet English Translation of the description of JP 2006027356 A (Year: 2006).*

(Continued)

*Primary Examiner* — James J Lee
*Assistant Examiner* — Andrew Sang Kim
(74) *Attorney, Agent, or Firm* — Dinsmore & Shohl LLP

(57) ABSTRACT

Vehicle malfunction detection systems and methods for detecting whether a lighting element of a vehicle satisfies a malfunction condition are disclosed herein. The vehicle malfunction detection system includes a detection unit detecting an operational state of the lighting element of the vehicle, and a vehicle control unit configured to place the vehicle in a driving mode, wherein, in response to determining that the operational state of the lighting element satisfies the malfunction condition, a vehicle start prevention signal is transmitted to the vehicle control unit, the vehicle start prevention signal including an instruction to prevent the vehicle from entering the driving mode.

13 Claims, 2 Drawing Sheets

(56) References Cited

U.S. PATENT DOCUMENTS

| | | | |
|---|---|---|---|
| 2015/0116099 A1* | 4/2015 | Straugheir | B60L 53/31 340/426.11 |
| 2017/0072854 A1* | 3/2017 | Cornelius | B60Q 11/005 |
| 2017/0259729 A1 | 9/2017 | Balasundrum | |

FOREIGN PATENT DOCUMENTS

| | | | | |
|---|---|---|---|---|
| JP | 2006027356 A | * | 2/2006 | B60W 50/0205 |
| WO | 2015086098 A1 | | 6/2015 | |

OTHER PUBLICATIONS

DE-102021106505-A1 English Translation and Foreign Publication (Year: 2020).*

* cited by examiner though the
SYSTEMS AND METHODS FOR PREVENTING OPERATION OF A VEHICLE DURING MALFUNCTION OF A LIGHTING ELEMENT

CROSS-REFERENCE TO RELATED APPLICATION

This application claims priority to U.S. Provisional Patent Application No. 63/124,358, filed Dec. 11, 2020, for "Systems And Methods For Preventing Operation Of A Vehicle During Malfunction Of A Lighting Element," which is hereby incorporated by reference in its entirety including the drawings.

TECHNICAL FIELD

The present specification generally relates to systems and methods for preventing operation of a vehicle during a malfunction condition and, more specifically, systems and methods for immobilizing a vehicle when a lighting element of the vehicle is malfunctioning.

BACKGROUND

Conventional vehicles may utilize an immobilizer to determine whether a correct key is being used to start the vehicle. If the correct key is not present, the immobilizer will not permit the vehicle to be started. This ensures that the vehicle is driven only by the intended user and not subject to theft. However, vehicle immobilizers currently are not used to prevent operation of the vehicle when other vehicle conditions are not satisfied.

SUMMARY

In one embodiment, a method includes detecting an operational state of a lighting element of a vehicle, and transmitting, in response to a determination that the operational state of the lighting element satisfies a malfunction condition, a vehicle start prevention signal to a vehicle control unit, the vehicle start prevention signal including an instruction to prevent the vehicle from entering a driving mode.

In another embodiment, a vehicle malfunction detection system includes a detection unit detecting an operational state of a lighting element of a vehicle, and a vehicle control unit configured to place the vehicle in a driving mode, wherein, in response to determining that the operational state of the lighting element satisfies a malfunction condition, a vehicle start prevention signal is transmitted to the vehicle control unit, the vehicle start prevention signal including an instruction to prevent the vehicle from entering the driving mode.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
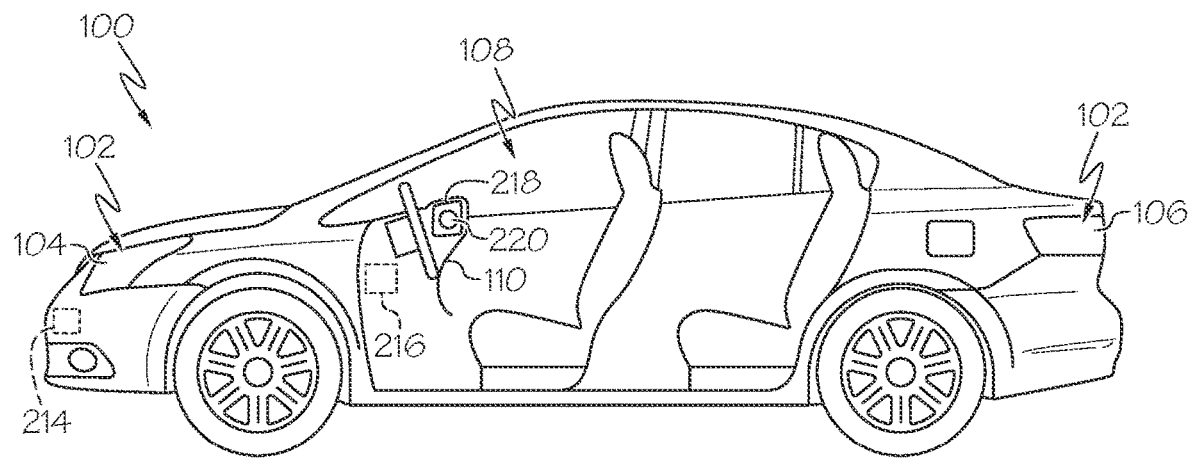
FIG. 1 schematically depicts a vehicle including one or more lighting elements according to one or more embodiments shown and described herein.

Embodiments described herein are directed to vehicle malfunction detection systems and methods for detecting an operating state of a lighting element of a vehicle, and preventing the vehicle from entering a driving mode when the operating state of the lighting element satisfies a malfunction condition.

The vehicle malfunction detection systems described herein include a detection unit for detecting an operational state of a lighting element of a vehicle, and a vehicle control unit configured to place the vehicle in a driving mode. In response to determining that the operational state of the lighting element satisfies a malfunction condition, a vehicle start prevention signal is transmitted to the vehicle control unit. The vehicle start prevention signal includes an instruction to prevent the vehicle from entering the driving mode. Various embodiments of the vehicle malfunction detection systems and methods of the operation of the vehicle malfunction detection systems are described in more detail herein. Whenever possible, the same reference numerals will be used throughout the drawings to refer to the same or like parts.

Referring now to FIG. 1, a vehicle 100 is illustrated according to one or more embodiments described herein. The vehicle 100 may be an automobile or any other passenger or non-passenger vehicle such as, for example, a terrestrial, aquatic, and/or airborne vehicle including, but not limited to, a bus, a bicycle, and a scooter. In some embodiments, the vehicle 100 may be an autonomous vehicle that navigates its environment with limited human input or without human input.

The vehicle 100 generally includes one or more lighting elements 102 such as, for example, one or more headlights 104, taillights 106, brake lights, turn signals, exterior illumination lamps, and the like. As shown, the vehicle 100 includes a headlight 104 and a taillight 106, although the vehicle 100 may include additional lighting elements 102 not illustrated. The lighting elements 102 may be, but not limited to, halogen bulbs, light emitting diodes (LEDs), or high intensity discharge (HID) lamps. Additionally, the lighting elements 102 may include a plurality of bulbs, lamps, diodes, or the like operated between an ON and OFF state by a circuit, which receives instructions from a control unit of the vehicle 100. As a non-limiting example, when the lighting elements 102 comprise the headlights 104, the control unit of the vehicle 100 may transmit instructions to the circuit of the lighting elements 102 to operate in the ON state when a detected light level surrounding the vehicle 100 is below a threshold, and operate in the OFF state when a detected light level is above a threshold. As another non-limiting example, when the lighting elements 102 comprise the taillights 106, the control unit of the vehicle 100 may transmit instructions to the circuit of the lighting elements 102 to operate in the ON state when a brake pedal of the vehicle 100 is depressed, and operate in the OFF state when the brake pedal is not depressed.

As discussed in more detail herein, the vehicle 100 also includes a vehicle control unit 216 for performing vehicle operations such as, for example, placing the vehicle 100 in either an off mode, an accessory mode, or a driving mode. The vehicle control unit 216 may be instructed to place the vehicle 100 in the off mode, the accessory mode, or the driving mode in response to a user performing a vehicle start operation such as, for example, turning an ignition key, pushing a button on the vehicle 100, or any other suitable action. When the vehicle 100 is placed in the off mode, the vehicle 100 is not operated and a power supply, such as a battery, is deactivated. When the vehicle 100 is placed in the accessory mode, the battery is, at least partially, activated to power certain electronic devices of the vehicle 100 such as, for example, the lighting elements 102, or other accessories including a radio, an air conditioning device, a navigation unit, and the like. When the vehicle 100 is placed in the driving mode, an engine or an electric motor of the vehicle 100 is started in addition to the devices powered during the accessory mode. It should be appreciated that when the vehicle 100 is in the driving mode, the vehicle 100 is capable of being driven. However, when the vehicle 100 is in the off mode or the accessory mode, the engine or the electric motor is not started and driving of the vehicle 100 is not permitted.

In embodiments, discussed in more detail herein, the vehicle 100 also includes a light sensor 214, a display device 218, and a user control device 220. As shown in FIG. 1, the light sensor 214 detects an amount of light surrounding the vehicle 100. Specifically, the light sensor 213 is a photoelectric device that converts detected light energy into an electrical signal, which the vehicle equates to a detected light level. The light sensor 214 may include a phototransistor, a photodiode, or a photonic integrated circuit, which integrates a photodetector and an amplifier in one device. As shown, the light sensor 214 is provided at a front end of the vehicle 100 proximate the headlight 104. However, it should be appreciated that the light sensor 214 may be located at any other suitable location of the vehicle 100 such as, for example, at a rear end of the vehicle 100 proximate the taillight 106, on a side panel of the vehicle 100, and/or on a roof of the vehicle 100. As discussed in more detail herein, the display device 218 and the user control device 220 are provided within a passenger compartment 108 of the vehicle 100 such as, for example, within a dash panel 110 of the vehicle 100.

Figure 2:
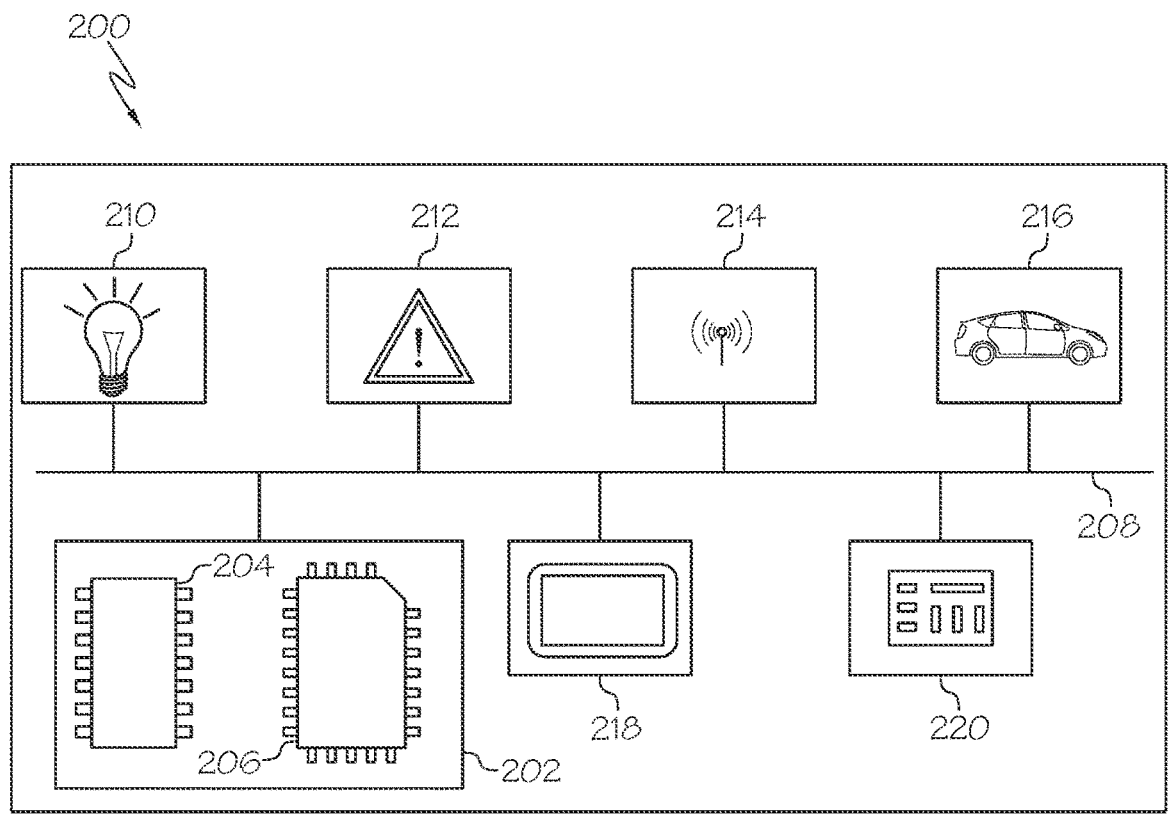
FIG. 2 schematically depicts a vehicle malfunction detection system of the vehicle according to one or more embodiments shown and described herein.

FIG. 2 depicts a schematic diagram of the vehicle malfunction detection system, which may be referred to herein as a vehicle system 200, according to one or more embodiments shown and described herein. It is noted that, while the vehicle system 200 is depicted in isolation, the vehicle system 200 may be included within the vehicle 100 of FIG. 1. The vehicle system 200 includes a controller 202 including one or more processors 204 and one or more memory modules 206. Each of the one or more processors 204 may be any device capable of executing machine readable and executable instructions. Accordingly, each of the one or more processors 204 may be an integrated circuit, a microchip, a computer, or any other computing device. The one or more processors 204 are coupled to a communication path 208 that provides signal interconnectivity between various modules of the vehicle system 200. Accordingly, the communication path 208 may communicatively couple any number of processors 204 with one another, and allow the modules coupled to the communication path 208 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 208 may be formed from any medium that is capable of transmitting a signal such as, for example, conductive wires, conductive traces, optical waveguides, or the like. In some embodiments, the communication path 208 may facilitate the transmission of wireless signals, such as WiFi, Bluetooth®, Near Field Communication (NFC) and the like. Moreover, the communication path 208 may be formed from a combination of mediums capable of transmitting signals. In one embodiment, the communication path 208 comprises a combination of conductive traces, conductive wires, connectors, and buses that cooperate to permit the transmission of electrical data signals to components such as processors, memories, sensors, input devices, output devices, and communication devices. Accordingly, the communication path 208 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the vehicle system 200 includes one or more memory modules 206 coupled to the communication path 208. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 includes a detection unit 210 coupled to the communication path 208 for monitoring the lighting element 102 of the vehicle 100, as shown in FIG. 1, and detecting an operational state of the lighting element 102. An operational state of the lighting element 102 may include parameters such as, for example, how much power the lighting element 102 is receiving from a power supply of the vehicle 100, i.e., power input, how much light the lighting element 102 is currently outputting or capable of outputting, i.e., a light output, and the like. In embodiments, the detection unit 210 may be activated in response to the vehicle 100 entering the accessory mode, at which point power is provided to the detection unit 210 to detect the operational state of the lighting element 102. In other embodiments, the detection unit 210 may be activated, at least intermittently, prior to the vehicle 100 entering the accessory mode, such as when the vehicle 100 is in the off mode. As such, the detection unit 210 may receive power from the power supply of the vehicle 100 or, alternatively, include a separate power supply, which powers the detection unit 210 prior to the vehicle 100 entering the accessory mode.

The vehicle system 200 also includes an immobilizer 212 coupled to the communication path 208 for receiving an operational state signal transmitted from the detection unit 210 indicating the operational state of the lighting element 102. The immobilizer 212 compares the parameters of the lighting element 102 provided in the operational state signal to threshold parameters to determine whether or not a malfunction condition is satisfied. In embodiments, the malfunction condition is satisfied if a light output detected by the detection unit 210 is below a threshold light output. If the light output of the lighting element 102 is below the threshold light output, this is indicative that the lighting element 102 is not producing the intending amount of light and is malfunctioning. In embodiments, the malfunction condition is satisfied if the amount of power being received at the lighting element 102, i.e., the power input, is below a threshold power input. This indicates that the lighting element 102 is not receiving enough power to operate properly and is malfunctioning. Other examples of the lighting element 102 malfunctioning include the lighting element 102 not operating as instructed by a control unit of the vehicle 100. This may be the case if a circuit of the lighting element 102 is not receiving or processing instructions properly. When the malfunction condition is satisfied, the immobilizer 212 transmits a vehicle start prevention signal to the vehicle control unit 216. The vehicle start prevention signal includes an instruction to prevent the vehicle 100 from entering the driving mode.

As discussed herein, the vehicle system 200 includes the light sensor 214 coupled to the communication path 208 for detecting an ambient light level around the vehicle 100. The light sensor 214 may include a phototransistor, a photodiode, or a photonic integrated circuit, which integrates a photodetector and an amplifier in one device. In embodiments, the vehicle system 200 may include a plurality of light sensors positioned at various locations on the vehicle 100 to detect light levels at multiple locations of the vehicle 100. However, the light sensor 214 should be positioned away from the lighting element 102 such that the light sensor 214 detects ambient light surrounding the vehicle 100, not light emitted by the lighting element 102. In embodiments, the light sensor 214 may be operated prior to the vehicle 100 entering the accessory mode or in response to the vehicle 100 entering the accessory mode. Once activated, the light sensor 214 transmits a signal to the vehicle control unit 216 indicating the detected light level around the vehicle 100.

The vehicle system 200 also includes the vehicle control unit 216, as discussed herein. The vehicle control unit 216 is coupled to the communication path 208. As noted above, the vehicle control unit 216 places the vehicle 100 in either the off mode, the accessory mode, or the driving mode in response to a user performing a vehicle start operation such as, for example, inserting a key, operating an ignition switch, or some other manner for activating the engine or motor of the vehicle 100.

The vehicle system 200 also includes the display device 218 discussed herein. The display device 218 is coupled to the communication path 208. The display device 218 may display or output a notification in response to the immobilizer 212 determining that the malfunction condition has been satisfied based on the detected operational state of the lighting element 102. The display device 218 may include any medium capable of transmitting an optical output such as, for example, a cathode ray tube, light emitting diodes, a liquid crystal display, a plasma display, or the like. In embodiments, the display device 218 includes speakers for providing an audible notification. The notification indicates that the lighting element 102 is malfunctioning and that the vehicle 100 is not be permitted to enter the driving mode.

The vehicle system 200 also includes the user control device 220 coupled to the communication path 208. The user control device 220 includes one or more controls for making selections as to how the vehicle control unit 216 should respond to receiving the vehicle start prevention signal. For example, the user control device 220 may be operated to instruct the vehicle control unit 216 to override the instructions of the vehicle start prevention signal, thereby permitting the vehicle 100 to enter the driving mode despite the malfunction condition being satisfied. The one or more controls of the user control device 220 may include, for example, buttons or the like. In some embodiments, the user control device 220 includes a user interface, such as a touch screen user interface. As such, the user control device 220 may be included or incorporated into the display device 218.

Figure 3:
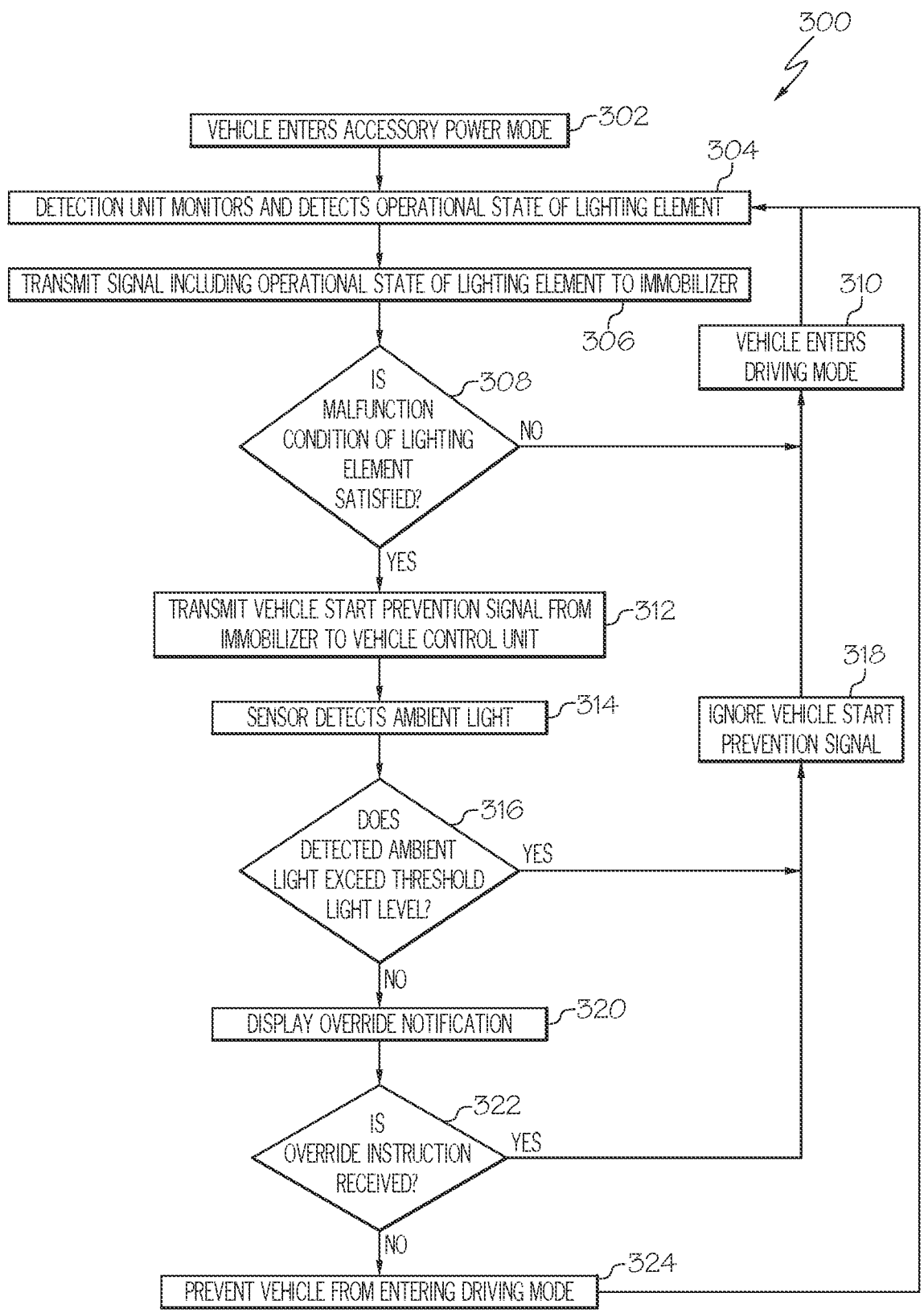
FIG. 3 schematically depicts a flow diagram of a method for determining whether a lighting element of the vehicle satisfies a malfunction condition and preventing the vehicle from entering a driving mode according to one or more embodiments shown and described herein.

FIG. 3 depicts a method 300 for determining whether the lighting element 102 of the vehicle 100 is malfunctioning and, if so, preventing the vehicle 100 from entering the driving mode, according to one or more embodiments shown and described herein. The method 300 is described herein with reference to FIGS. 1 and 2.

At step 302, the vehicle 100 is initially in the off mode and enters the accessory mode in response to a user of the vehicle 100 performing a vehicle start operation. Typically, the vehicle start operation performed by the user is intended to place the vehicle 100 in the driving mode. Thus, it should be understood that the individual steps of the method 300 discussed herein are performed when the vehicle 100 is in the accessory mode and prior to the vehicle 100 entering the driving mode. In some embodiments, at least some of the steps may be performed when the vehicle 100 is in the off mode, prior to entering the accessory mode.

At step 304, the detection unit 210 is activated. Activation may occur when the vehicle 100 enters the accessory mode at step 302 or may occur prior to when the vehicle 100 enters the accessory mode at step 302. Once activated, the detection unit 210 monitors the lighting element 102 and detects an operational state of the lighting element 102. As discussed above, the operational state of the lighting element 102 may indicate how much power the lighting element 102 is receiving from a power supply of the vehicle 100, i.e., power input, how much light the lighting element 102 is currently outputting or capable of outputting, i.e., a light output, and the like. In embodiments, this may be determined without actually illuminating the lighting element 102. As a non-limiting example, the detection unit 210 may detect the operation state of the lighting element 102 based on a break in the circuit of the lighting element 102 or a loss of communication between the detection unit 210 and the lighting element 102. As another non-limiting example, the detection unit 210 may detect the operation state of the lighting element 102 based on a change in power draw prior to the lighting element 102 being activated. The change in power draw may be an increase in power draw at the lighting element 102 due to a power surge and/or a decrease in power draw being received at the lighting element 102. In the above examples, the break in the circuit, the loss of communication, and change in power draw indicates that the lighting element 102 is not currently receiving or capable of receiving instructions from a control unit of the vehicle 100 to perform the required operations included in the instructions, i.e., exhibiting a malfunction.

At step 306, an operational state signal including parameters indicating the operational state of the lighting element 102 is transmitted from the detection unit 210 to the immobilizer 212. At step 308, the immobilizer 212 analyzes the operational state signal to determine whether a malfunction condition of the lighting element 102 is satisfied. Specifically, in embodiments, the immobilizer 212 will compare the parameters of the operational state signal to determine whether a light output, or potential light output, detected by the detection unit 210 is below a threshold light output. In other embodiments, the immobilizer 212 will determine whether the amount of power being received at the lighting element 102 is below a threshold power input, or whether the circuit of the lighting element 102 is not operating in accordance with instructions from the vehicle 100. It should be appreciated that the above examples do not provide an exhaustive list of examples indicating a malfunction of the lighting element 102 and other examples are contemplated as being within the scope of the present disclosure. If at least one of the conditions are met, the immobilizer 212 will determine that the malfunction condition is satisfied. Alternatively, if none of the conditions is met, the immobilizer 212 will determine that the malfunction condition is not satisfied.

If the malfunction condition is not satisfied, the method 300 proceeds to step 310, at which the vehicle control unit 216 permits the vehicle 100 to enter the driving mode. Thereafter, the method 300 returns to step 304 to continue monitoring the operational state of the lighting element 102 while the vehicle 100 is in the driving mode. Alternatively, if the malfunction condition is satisfied, the method 300 proceeds to step 312, at which the immobilizer 212 transmits the vehicle start prevention signal to the vehicle control unit 216. The vehicle start prevention signal includes an instruction that the vehicle control unit 216 should prevent the vehicle 100 from entering the driving mode.

In embodiments, at step 314, the light sensor 214 is activated and detects ambient light surrounding the vehicle 100. A determination is made at step 316 as to whether the detected ambient light exceeds a threshold light level. If so, the method 300 proceeds to step 318, at which the vehicle start prevention signal is ignored by the vehicle control unit 216. This is useful in instances in which the vehicle 100 is in a well-lit area or a sufficient amount of ambient light is provided such that the vehicle 100 does not need to utilize the lighting element 102, such as during the day. Thereafter, the vehicle 100 enters the driving mode at step 310 and proceeds to step 304 to continue monitoring the operational state of the lighting element 102. Although step 314 of detecting ambient light and step 316 of determining whether the detected light exceeds the threshold light level is discussed herein as being performed after the vehicle start prevention signal is transmitted to the vehicle control unit 216, it should be understood that steps 314 and 316 be performed earlier, thereby preventing the vehicle start prevention signal from being transmitted at all.

Alternatively, in embodiments, if it is determined at step 316 that the detected ambient light does not exceed the threshold light level, the method 300 proceeds to step 320 to display or provide an override notification on the display device 218. At step 322, it is determined whether an override instruction is received by a user operating the user control device 220. The override instruction may be provided by the user operating the controls of the user control device 220 to disregard the vehicle start prevention signal. The override instruction may be, for example, selecting an option to accept the vehicle start prevention signal. Alternatively, no override instruction may be provided if the user chooses to select an option to accept the vehicle start prevention signal. If the display device 218 receives the override instruction, the method 300 returns to step 318 such that the vehicle control unit 216 ignores the vehicle start prevention signal. Thereafter, the vehicle 100 enters the driving mode at step 310 and the detection unit 210 continues to monitor the operational state of the lighting element 102 at step 306 while the vehicle 100 is being driven. Alternatively, if the override instruction is not received at step 322, the vehicle control unit 216 prevents the vehicle 100 from entering the driving mode at step 324. At step 324, the display device 218 may provide a subsequent notification that operation of the vehicle 100 in the driving mode is prohibited and may provide details as to the specific malfunction condition that was satisfied. Again, the method 300 proceeds to step 304 such that the detection unit 210 continues to monitor the operational state of the lighting element 102. Thus, once the lighting element 102 is corrected such that the malfunction condition is no longer satisfied at step 308, or the override instruction is received at step 322, the vehicle 100 will be permitted to enter the driving mode.

From the above, it is to be appreciated that defined herein are vehicle malfunction detection systems including a detection unit detecting an operational state of a lighting element of a vehicle, and a vehicle control unit configured to place the vehicle in a driving mode in response to determining that the operational state of the lighting element does not satisfy a malfunction condition. Also described herein are methods for determining whether a lighting element of a vehicle is malfunctioning and, if so, transmitting an instruction to prevent the vehicle from entering a driving mode.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    detecting an ambient light level surrounding the vehicle;
    detecting an operational state of a lighting element of a vehicle; and
    transmitting, in response to a determination that the detected ambient light level does not exceed a threshold light level and a determination that the operational state of the lighting element satisfies a malfunction condition, a vehicle start prevention signal to a vehicle control unit, the vehicle start prevention signal including an instruction to prevent the vehicle from entering a driving mode.

2. The method of claim 1, further comprising:
    providing, in response to transmitting the vehicle start prevention signal, a notification indicating that the vehicle is prevented from entering the driving mode.

3. The method of claim 1, further comprising ignoring, by the vehicle control unit, the vehicle start prevention signal in response to receiving an override instruction.

4. The method of claim 1, wherein the lighting element is a headlight of the vehicle.

5. The method of claim 1, wherein the lighting element is a taillight of the vehicle.

6. The method of claim 4, wherein the malfunction condition is satisfied if a light output of the headlight is below a threshold light output.

7. The method of claim 1, further comprising:
transmitting an operational state signal indicating the detected operational state of the lighting element from a detection unit to an immobilizer; and
transmitting the vehicle start prevention signal from the immobilizer to the vehicle control unit in response to the immobilizer determining that the operational state of the lighting element satisfies the malfunction condition, the vehicle control unit configured to place the vehicle in an off mode, an accessory mode, or the driving mode.

8. The method of claim 7, further comprising:
activating the detection unit and the immobilizer in response to the vehicle entering the accessory mode.

9. The method of claim 7, further comprising:
activating the detection unit and the immobilizer prior to the vehicle entering the accessory mode.

10. A vehicle malfunction detection system comprising:
a light sensor for detecting an ambient light level surrounding a vehicle;
a lighting element; and
a vehicle control unit configured to place the vehicle in a driving mode,
wherein, in response to determining that the detected ambient light level does not exceed a threshold light level and determining that a detected operational state of the lighting element satisfies a malfunction condition, a vehicle start prevention signal is transmitted to the vehicle control unit, the vehicle start prevention signal including an instruction to prevent the vehicle from entering the driving mode.

11. The vehicle malfunction detection system of claim 10, wherein the vehicle control unit ignores the vehicle start prevention signal in response to receiving an override instruction.

12. The vehicle malfunction detection system of claim 10, wherein the malfunction condition is satisfied if a light output of the lighting element is below a threshold light output.

13. The vehicle malfunction detection system of claim 10, further comprising:
an immobilizer configured to receive an operational state signal indicating the detected operational state of the lighting element, and transmit the vehicle start prevention signal to the vehicle control unit to prevent the vehicle from entering the driving mode.

* * * * *